United States Patent
Tang et al.

(10) Patent No.: US 12,489,662 B2
(45) Date of Patent: Dec. 2, 2025

(54) TRANSMITTER AND METHOD FOR DYNAMICALLY SETTING CURRENT MODE OF TRANSMITTER

(71) Applicant: MEDIATEK INC., Hsin-Chu (TW)

(72) Inventors: Ming-Fu Tang, Hsinchu (TW); Jia-Yu Liu, Hsinchu (TW); Jian-Yu Chu, Hsinchu (TW); Yen-Liang Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 71 days.

(21) Appl. No.: 18/645,362

(22) Filed: Apr. 24, 2024

(65) Prior Publication Data
US 2024/0380644 A1    Nov. 14, 2024

Related U.S. Application Data

(60) Provisional application No. 63/558,160, filed on Feb. 27, 2024, provisional application No. 63/501,422, filed on May 11, 2023.

(51) Int. Cl.
*H04L 27/00* (2006.01)
*H04L 5/00* (2006.01)
*H04L 27/34* (2006.01)

(52) U.S. Cl.
CPC ........ *H04L 27/0008* (2013.01); *H04L 5/0007* (2013.01); *H04L 27/3405* (2013.01)

(58) Field of Classification Search
CPC .......... H04L 27/0008; H04L 5/0007; H04L 27/3405
See application file for complete search history.

(56) References Cited

U.S. PATENT DOCUMENTS

| 9,588,574 B2 | 3/2017 | Maheshwari | |
| 9,961,632 B2* | 5/2018 | Sarrigeorgidis | ....... H04B 1/525 |
| 2008/0231372 A1* | 9/2008 | Chen | ..................... H03F 1/0211 |
| | | | 330/296 |

(Continued)

FOREIGN PATENT DOCUMENTS

| CN | 110166004 A | 8/2019 |
| EP | 2 639 983 A1 | 9/2013 |

(Continued)

*Primary Examiner* — Freshteh N Aghdam
(74) *Attorney, Agent, or Firm* — Winston Hsu (57) ABSTRACT

A transmitter and a method for dynamically setting a current mode of the transmitter are provided. The transmitter includes a digital signal processing (DSP) circuit and a radio frequency (RF) circuit. The DSP circuit is configured to determine a target current mode by selecting one of multiple candidate current modes of the transmitter according to instantaneous transmitting (TX) information, wherein the instantaneous TX information includes at least one of a resource block (RB) information, a modulation and coding scheme (MCS), and an orthogonal frequency-division multiplexing (OFDM) type of an instantaneous TX signal. The RF circuit is configured to output the instantaneous TX signal, wherein at least one supply voltage and at least one bias voltage of a power amplifier (PA) of the RF circuit is controlled according to the target current mode. More particularly, the multiple candidate current modes correspond to different target power consumptions of the transmitter, respectively.

21 Claims, 6 Drawing Sheets

(56) References Cited

U.S. PATENT DOCUMENTS

| | | |
|---|---|---|
| 2012/0064849 A1 | 3/2012 | Langer |
| 2013/0187711 A1* | 7/2013 | Goedken .............. H03F 1/0227 |
| | | 330/149 |
| 2016/0036386 A1 | 2/2016 | Morshedi |
| 2021/0204303 A1 | 7/2021 | Kristem |
| 2023/0231521 A1* | 7/2023 | Granger-Jones ...... H03F 1/0227 |
| | | 330/297 |

FOREIGN PATENT DOCUMENTS

| | | |
|---|---|---|
| WO | 2013/109467 A2 | 7/2013 |
| WO | 2013/109467 A3 | 9/2013 |
| WO | 2021/061485 A1 | 4/2021 |
| WO | 2021/206482 A1 | 10/2021 |

* cited by examiner

TRANSMITTER AND METHOD FOR DYNAMICALLY SETTING CURRENT MODE OF TRANSMITTER

CROSS REFERENCE TO RELATED APPLICATIONS

This application claims the benefit of U.S. Provisional Application No. 63/501,422, filed on May 11, 2023. Further, this application claims the benefit of U.S. Provisional Application No. 63/558,160, filed on Feb. 27, 2024. The contents of these applications are incorporated herein by reference.

BACKGROUND

The present invention is related to current consumption of radio frequency (RF) circuits, and more particularly, to a transmitter and a method for dynamically setting a current mode of the transmitter.

Current consumption is one of crucial performance metrics of mobile devices, since it is directly related to an endurance of a device. More particularly, transmitting (TX) radio frequency (RF) modules typically dominate a current consumption performance of the device. To ensure that a quality of a transmitted signal is sufficient good, various performance specifications such as an adjacent channel leakage ratio (ACLR) need to be met under different TX conditions. When a fixed configuration is applied to all of these TX conditions, this configuration needs to meet requirement of the most critical case among these TX conditions. Such configuration introduces unnecessary power consumption in relaxed TX conditions, however.

Thus, there is a need for a novel architecture and an associated method, which can dynamically control the configuration of the transmitter, in order to optimize power-efficiency of the transmitter in various TX conditions.

SUMMARY

An objective of the present invention is to provide a transmitter and a method for dynamically setting a current mode of the transmitter, in order to solve the problem of the related art without introducing any side effect or in a way that is less likely to introduce side effects.

At least one embodiment of the present invention provides a transmitter. The transmitter comprises a digital signal processing (DSP) circuit and a radio frequency (RF) circuit. The DSP circuit is configured to determine a target current mode by selecting one of multiple candidate current modes of the transmitter according to instantaneous transmitting (TX) information, wherein the instantaneous TX information comprises at least one of a resource block (RB) information, a modulation and coding scheme (MCS), and an orthogonal frequency-division multiplexing (OFDM) type of an instantaneous TX signal. The RF circuit is configured to output the instantaneous TX signal, wherein the RF circuit comprises a power amplifier (PA), and at least one supply voltage and at least one bias voltage of the PA is controlled according to the target current mode. More particularly, the multiple candidate current modes correspond to different target power consumptions of the transmitter, respectively.

At least one embodiment of the present invention provides a method for dynamically setting a current mode of a transmitter. The method comprises: utilizing a DSP circuit of the transmitter to determine a target current mode by selecting one of multiple candidate current modes of the transmitter according to instantaneous TX information, wherein the instantaneous TX information comprises at least one of a RB information, a MCS, and an OFDM type of an instantaneous TX signal; and utilizing a RF circuit of the transmitter to output the instantaneous TX signal, wherein the RF circuit comprises a power amplifier (PA), and at least one supply voltage and at least one bias voltage of the PA is controlled according to the target current mode. More particularly, the multiple candidate current modes correspond to different target power consumptions of the transmitter, respectively.

The transmitter and the method provided by the embodiment of the present invention can determine the current mode of the transmitter according to the RB information, the MCS, and the OFDM type of the instantaneous TX signal, to control the supply voltage and the bias voltage of the PA in response to various TX conditions, thereby optimizing power efficiency of the PA. In addition, the embodiments of the present invention will not greatly increase additional costs. Thus, the present invention can optimize the power-efficiency of the transmitter (e.g. the PA therein) in various TX conditions.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
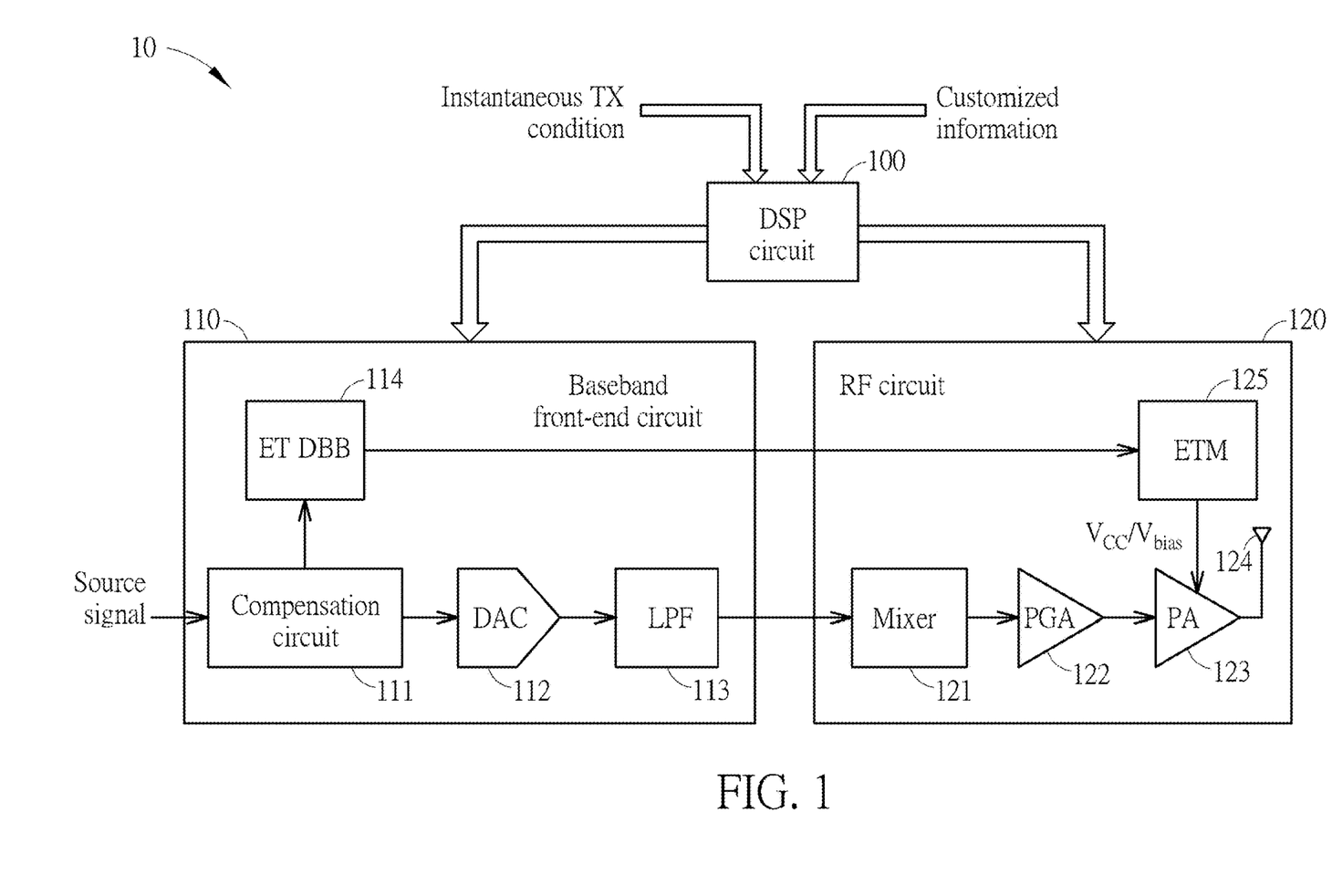
FIG. 1 is a diagram illustrating a transmitter according to an embodiment of the present invention.

FIG. 1 is a diagram illustrating a transmitter 10 according to an embodiment of the present invention. As shown in FIG. 1, the transmitter 10 may comprise a digital signal processing (DSP) circuit 100, a baseband front-end circuit 110 and a radio frequency (RF) circuit 120, where the DSP circuit 100 is coupled to the baseband circuit 110 and the RF circuit 120, and the baseband circuit 110 is coupled to the RF circuit 120. In this embodiment, the DSP circuit 100 is configured to determine a target current mode by selecting one of multiple candidate current modes (e.g. a high current mode and a low current mode) of the transmitter 10 according to instantaneous transmitting (TX) information, where the instantaneous TX information may comprise at least one of a resource block (RB) information, a modulation and coding scheme (MCS), and an orthogonal frequency-division multiplexing (OFDM) type of an instantaneous TX signal to be transmitted. The baseband front-end circuit 110 may receive a source signal from a digital baseband circuit (not shown), and after the source signal is processed by the baseband front-end circuit 110, a processed signal is transmitted to the RF circuit 120, to make the RF circuit 120 output the instantaneous TX according to the processed signal. More particularly, the RF circuit 120 may comprise a mixer 121, a programmable gain amplifier (PGA) 122, a power amplifier (PA) 123, an antenna 124 and an envelope tracking modulator (ETM) 125. It should be noted that the PA 123 may dominate an overall power consumption of the transmitted 10, and at least one supply voltage and at least one bias voltage of the PA 123 may be controlled according to the target current mode, in order to achieve an optimized power efficiency under various instantaneous TX conditions. For example, the multiple candidate current modes may correspond to different target power consumptions of the transmitter 10, respectively.

In this embodiment, the baseband front-end circuit 110 may comprise a compensation circuit 111, digital-to-analog converter (DAC) 112, a low pass filter (LPF) 113 and an envelope tracking (ET) digital baseband (DBB) circuit 114 (labeled "ET DBB" in FIG. 1 for brevity). The compensation circuit 111 may perform compensation related to crest factor reduction (CFR), digital pre-distortion (DPD) and RF operations. The DAC 112 may perform digital-to-analog conversion on an output of the compensation circuit 111. The LPF 113 may perform low pass filtering on an output of the DAC 112. As for the RF circuit 120, the mixer 121 therein may up-convert an output of the baseband front-end circuit 110 (e.g. the LPF 113) to a RF band. The PGA 122 may amplify an output of the mixer 121 with a RF gain. The PA 123 may drive the antenna 124 with the instantaneous TX signal according to an output of the PGA 122, where ETM 125 may output the at least one supply voltage (e.g. $V_{CC}$) and the at least one bias voltage (e.g. $V_{bias}$) to the PA 123 according to control of the ET DBB circuit 114. In addition, a RF gain gear of the PGA may be controlled according to the target current mode. For example, the RF circuit 120 may control the RF gain of the PGA according to the target current mode. The components within the baseband front-end circuit 110 and the RF circuit 120 are well known by those skilled in this art, further details will be omitted here for brevity.

Figure 2:
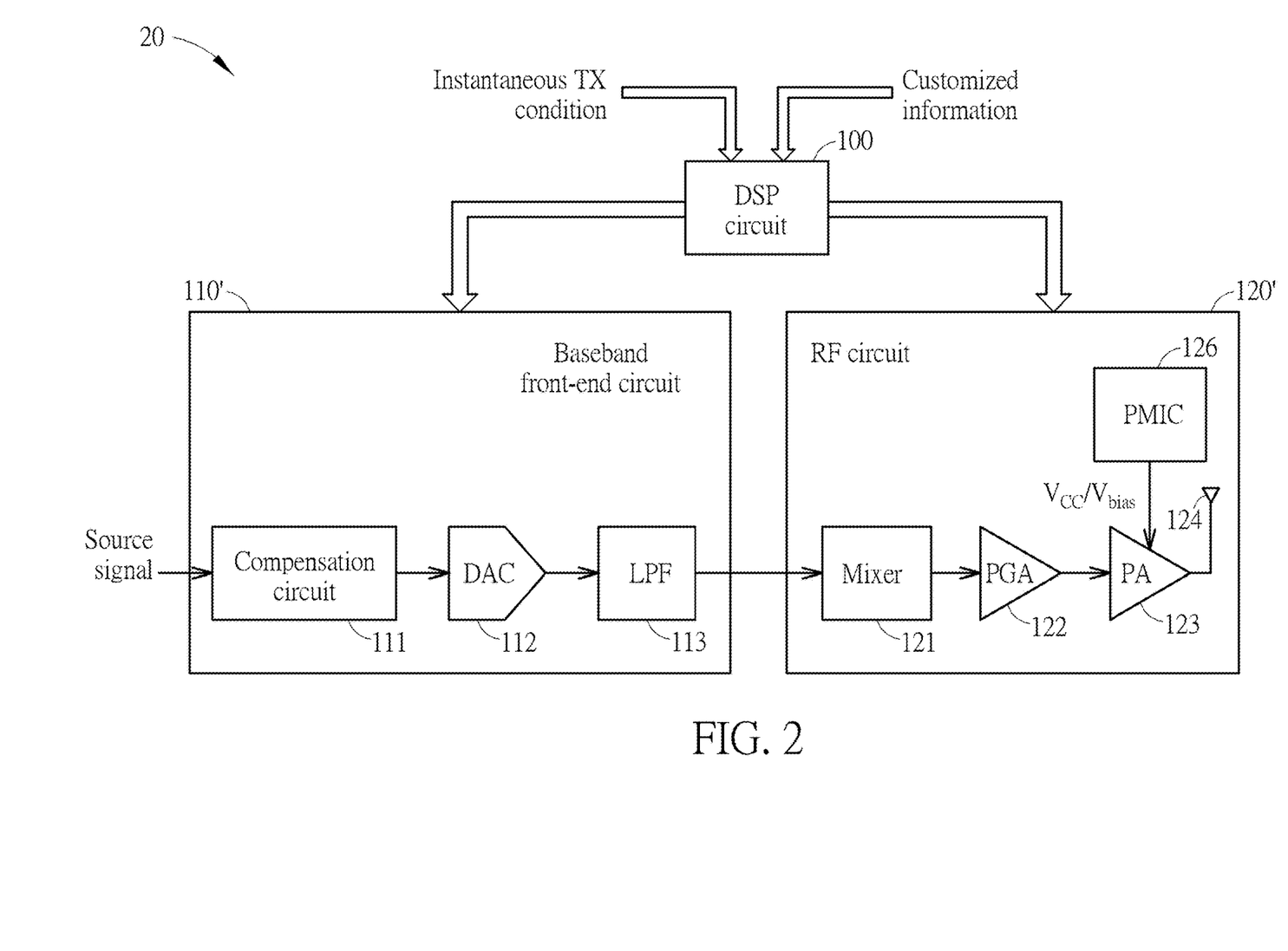
FIG. 2 is a diagram illustrating a transmitter according to another embodiment of the present invention.

It should be noted that the present invention is aimed at the DSP circuit 100 which controls the baseband front-end circuit 110 and the RF circuit 120 according to an instantaneous TX condition and customized information, and detailed implementation of the baseband front-end circuit 110 and the RF circuit 120 is not limited to that shown in FIG. 1. For example, FIG. 2 is a diagram illustrating a transmitter 20 according to another embodiment of the present invention. It should be noted that the transmitter 10 shown in FIG. 1 is equipped with an ET mechanism such as an analog ET (AET) or a digital ET (DET) mechanism. In comparison, the transmitter 20 shown in FIG. 2 is an architecture without the ET mechanism, where the baseband front-end circuit 110 and the RF circuit 120 are respectively replaced with a baseband front-end circuit 110' and a RF circuit 120'. In this embodiment, the ET DBB circuit 114 may be omitted in the baseband front-end circuit 110', and the ETM 125 may be replaced with a power management integrated circuit (PMIC) 126. The control executed by the DSP circuit 100 may be applied to both the transmitters 10 and 20, where the following description will take the transmitter 10 as an example for illustration, and the condition of applying to the transmitter 20 may be deduced by analogy.

In the embodiment of FIG. 1, the DSP circuit 100 may determine a PA gear according to the target current mode (e.g. different current mode correspond to different PA gears, respectively), where the at least one supply voltage (e.g. $V_{CC}$) and the at least one bias voltage (e.g. $V_{bias}$) of the PA 123 may be controlled according to the PA gear. In addition, the baseband front-end circuit 110 is configured to perform pre-processing on the source signal (e.g. processing of the compensation circuit 111, the DAC 112 and the LPF 113) to generate a pre-processed signal (e.g. the output of the LPF 113), to make the RF circuit output the instantaneous TX signal according to the pre-processed signal, where at least one baseband configuration of the baseband front-end circuit 110 is controlled according to the PA gear. The at least one baseband configuration may comprise a LPF bandwidth, average power tracking (APT), DPD, CFR, AET or DET settings (e.g. parameters), but the present invention is not limited thereto.

Different types of waveforms of the instantaneous TX signal may correspond to different performance requirements (e.g. linearity, power consumption), respectively, where the performance requirements of these different types of waveforms of the instantaneous TX signal may be indicated by a distinct indicator value, which may be calculated based on a peak-to-average power ratio (PAPR) and a maximum power reduction (MPR). For example, the distinct indicator value may be obtained by PAPR minus MPR, where the distinct indicator value may be referred to as a PAPR-MPR value for better comprehension. Thus, the PAPR-MPR value under these different types of waveforms of the instantaneous TX signal may be obtained by circuit simulation or chip measurement in advance, in order to determine a corresponding current mode (e.g. the high current mode or the low current mode) for each of the these different types of waveforms of the instantaneous TX signal.

Figure 3:
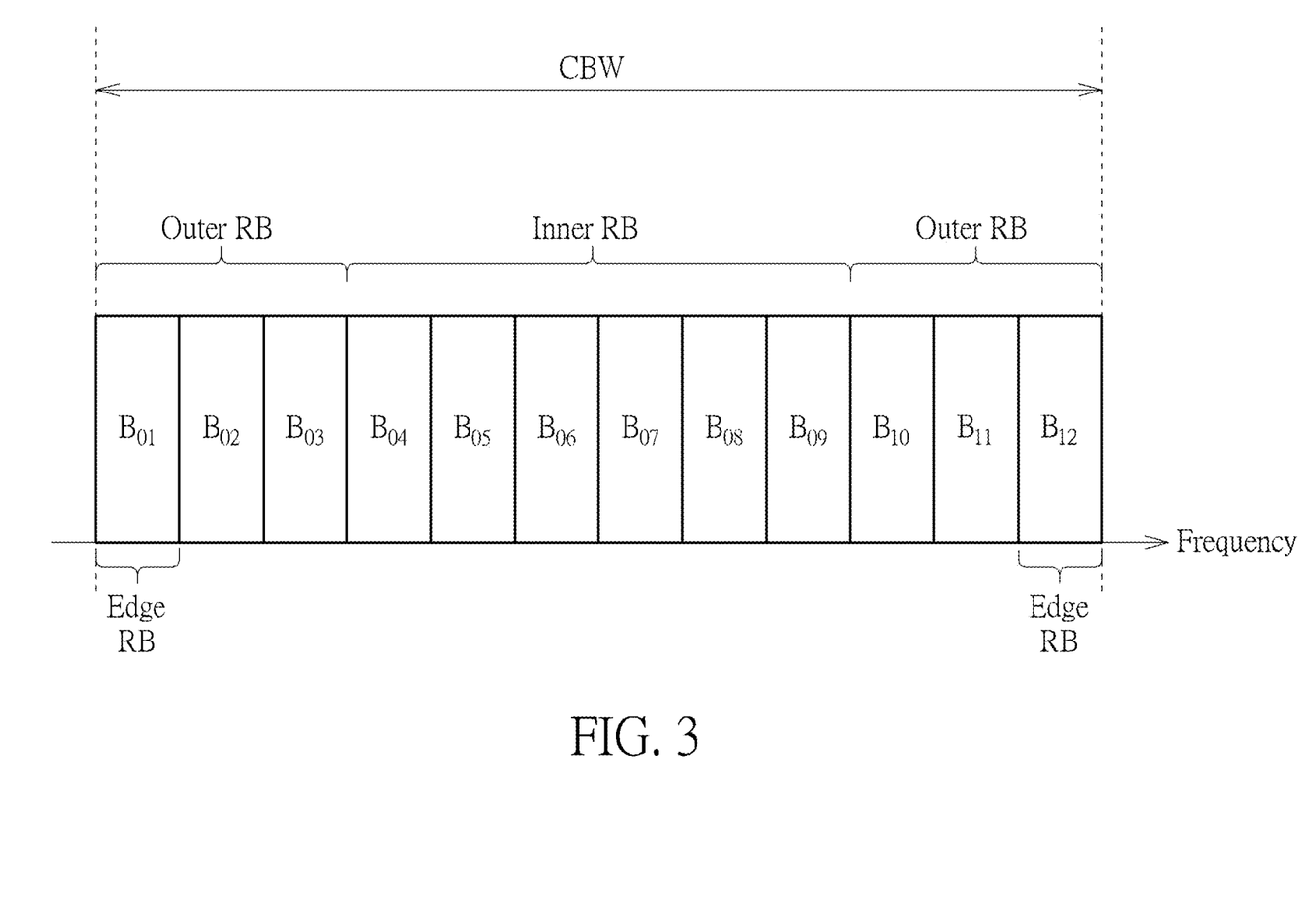
FIG. 3 is a diagram illustrating resource block allocation according to an embodiment of the present invention.

In detail, the RB information may at least comprise a RB allocation type, and the DSP circuit 100 may determine which one of inner RB allocation, outer RB allocation and edge RB allocation is the RB allocation type of the instantaneous TX signal according to a channel bandwidth (CBW), a sub-carrier spacing (SCS) and a RB length of the instantaneous TX signal. FIG. 3 is a diagram illustrating resource block allocation according to an embodiment of the present invention. Assume that the DSP circuit 100 determines that a certain CBW may be divided into twelve RBs such as $B_{01}$, $B_{02}$, $B_{03}$, $B_{04}$, $B_{05}$, $B_{06}$, $B_{07}$, $B_{08}$, $B_{09}$, $B_{10}$, $B_{11}$ and $B_{12}$. When the instantaneous TX signal merely utilizes one or more of the RBs $B_{04}$, $B_{05}$, $B_{06}$, $B_{07}$, $B_{08}$ and $B_{09}$ (i.e. the RBs $B_{01}$, $B_{02}$, $B_{03}$, $B_{10}$, $B_{11}$ and $B_{12}$ are not utilized), the DSP circuit 100 may determines that the RB allocation type of the instantaneous TX signal is an inner RB. When the instantaneous TX signal at least utilizes one or more of the RBs $B_{03}$ and $B_{10}$, the DSP circuit 100 may determines that the RB allocation type of the instantaneous TX signal is an outer RB. When the instantaneous TX signal merely utilizes one or more of the RBs $B_{01}$, $B_{02}$, $B_{11}$ and $B_{12}$ (more particularly, none of the RBs $B_{03}$, $B_{04}$, $B_{05}$, $B_{06}$, $B_{07}$, $B_{08}$, $B_{09}$, $B_{10}$ are utilized), the DSP circuit 100 may determines that the RB allocation type of the instantaneous TX signal is an edge RB. In addition, when all of the RBs $B_{04}$, $B_{05}$, $B_{06}$, $B_{07}$, $B_{08}$ and $B_{09}$ are utilized but the RBs $B_{01}$, $B_{02}$, $B_{03}$, $B_{10}$, $B_{11}$ and $B_{12}$ are not utilized, the RB allocation type of the instantaneous TX signal may be further referred to as inner full; and when all of the RBs $B_{01}$, $B_{02}$, $B_{03}$, $B_{04}$, $B_{05}$, $B_{06}$, $B_{07}$, $B_{08}$, $B_{09}$, $B_{10}$, $B_{11}$ and $B_{12}$ are utilized, the RB allocation type of the instantaneous TX signal may be further referred to as outer full. In this embodiment, the DSP circuit 100 may determine which one of binary phase-shift keying (BPSK), quadrature phase-shift keying (QPSK), 16-quadrature amplitude modulation (16-QAM), 64-quadrature amplitude modulation (64-QAM), and 256-quadrature amplitude modulation (256-QAM) is the MCS of the instantaneous TX signal. In addition, the DSP circuit 100 may determine which one of cyclic prefix orthogonal frequency division multiplexing (CP-OFDM) and discrete fourier transform-spreading orthogonal frequency division multiplexing (DFT-s-OFDM) is the OFDM type of the instantaneous TX signal.

TABLE 1

| Waveform type | OFDM type | MCS | RB information | PAPR-MPR |
|---|---|---|---|---|
| W01 | CP | 256QAM | Outer full | 1.88 |
| W02 | DFT | 256QAM | Outer full | 2.17 |
| W03 | DFT | BPSK | Outer full | 3.08 |
| W04 | DFT | 16QAM | Outer full | 3.26 |
| W05 | DFT | 64QAM | Outer full | 3.35 |
| W06 | DFT | QPSK | Outer full | 3.60 |
| W07 | CP | 64QAM | Outer full | 4.04 |
| W08 | CP | QPSK | Outer full | 4.43 |
| W09 | CP | 16QAM | Outer full | 4.46 |
| W10 | CP | 256QAM | Inner full | 1.88 |
| W11 | DFT | 256QAM | Inner full | 2.13 |
| W12 | DFT | 64QAM | Inner full | 3.18 |
| W13 | DFT | BPSK | Inner full | 3.60 |
| W14 | CP | 64QAM | Inner full | 4.19 |
| W15 | DFT | 16QAM | Inner full | 4.34 |
| W16 | DFT | QPSK | Inner full | 4.64 |
| W17 | CP | 16QAM | Inner full | 5.48 |
| W18 | CP | QPSK | Inner full | 5.76 |

Table 1 shows examples of different waveform types W01 to W18 with respective OFDM type, MCS and RB information, where PAPR-MPR values of the waveform types W01 to W18 are listed. It should be noted that a greater PAPR-MPR value of a certain waveform type means this waveform type has a higher requirement to linearity, and therefore this waveform type may need to be transmitted by the high current mode. A lower PAPR-MPR value of a certain waveform type means this waveform type has a lower requirement to linearity, and therefore it may be allowed to transmit this waveform type by the low current mode. For example, when the DSP circuit 100 determines that the instantaneous TX signal belongs to any of the waveform types W08, W09, W16, W17 and W18, the DSP circuit 100 may control the baseband front-end circuit 110 and the RF circuit 120 to operate in the high current mode (which may correspond to a higher level of the supply voltage $V_{CC}$ of the PA 123); and when the DSP circuit 100 determines that the instantaneous TX signal belongs to any of the waveform types W01, W02, W03, W04, W05, W06, W07, W10, W11, W12, W13, W14 and W15, the DSP circuit 100 may control the baseband front-end circuit 110 and the RF circuit 120 to operate in the low current mode (which may correspond to a lower level of the supply voltage $V_{CC}$ of the PA 123).

It should be noted that a threshold of the PAPR-MPR value for selecting either the high current mode or the low current mode is not limited to that illustrated above. Detailed determination mechanism may vary. More particularly, whether to assign the high current mode or the low current mode to a certain waveform type may be customized based on customized requirement, and is not meant to be a limitation of the present invention.

Figure 4:
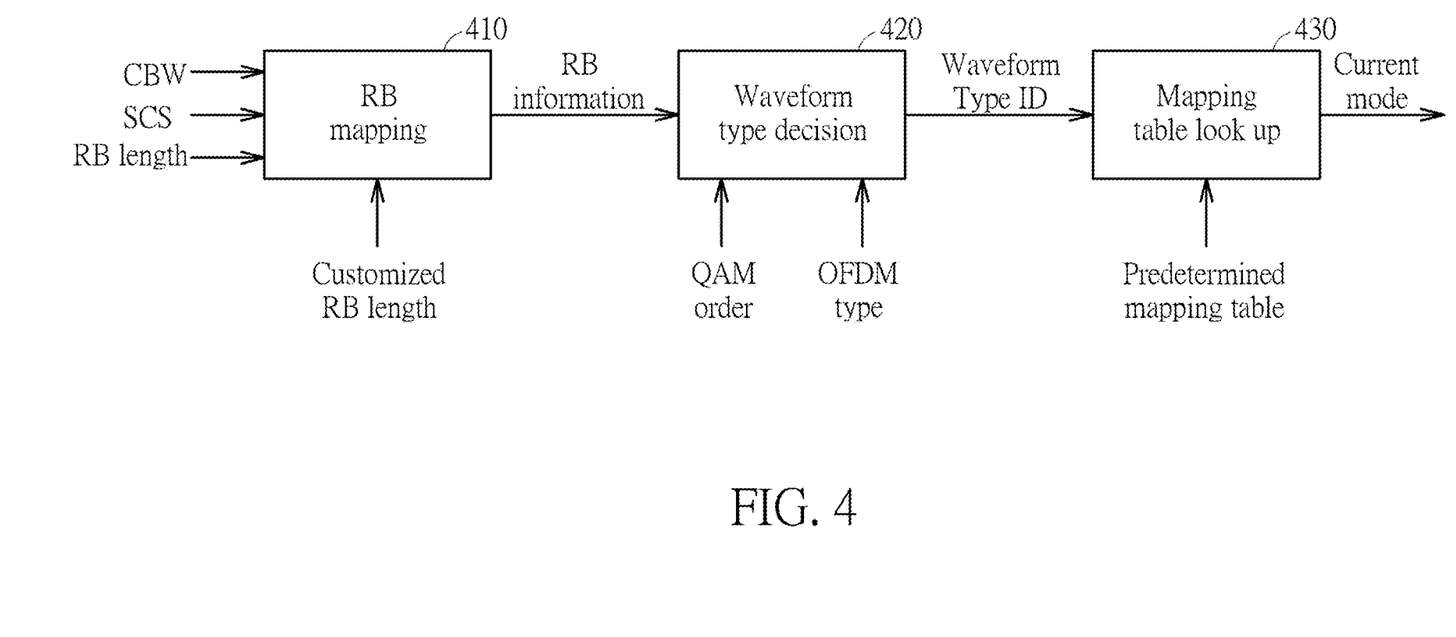
FIG. 4 is a diagram illustrating a current mode decision scheme according to an embodiment of the present invention.

FIG. 4 is a diagram illustrating a current mode decision scheme according to an embodiment of the present invention, where the current mode decision scheme may be implemented by hardware, software or firmware in the DSP circuit 100. In this embodiment, the DSP circuit 100 may utilize a RB mapping module 410 (labeled "RB mapping" in FIG. 4 for brevity) to output the RB information according to the CBW, the SCS and the RB length of the instantaneous TX signal, and the DSP circuit 100 may further utilize a waveform type decision module 420 (labeled "Waveform type decision module" in FIG. 4 for brevity) to generate a waveform type identifier (ID) according to the RB information, the MCS (e.g. a QAM order) and the OFDM type of the instantaneous TX signal, where the DSP 100 may utilize a mapping table look up module 430 (labeled "Mapping table look up" in FIG. 4 for brevity) to determine the target current mode corresponding to the waveform type ID by searching the waveform type ID in a look-up table (e.g. a predetermined mapping table which is built in advance).

TABLE 2

| | | Outer | Inner | Edge | Customized RB |
|---|---|---|---|---|---|
| DFT-s-OFDM | BPSK | Low | Low | Low | TBD as |
| | QPSK | Low | Low | Low | customer's |
| | 16QAM | Low | Low | Low | preference |
| | 64QAM | Low | Low | Low | |
| | 256QAM | Low | Low | Low | |
| CP-OFDM | QPSK | High | High | High | |
| | 16QAM | High | High | High | |
| | 64QAM | Low | Low | Low | |
| | 256QAM | Low | Low | Low | |

Table 2 shows a mapping table which is built in advance under different instantaneous conditions. In addition, customized preference (e.g. assign the high current mode or the low current mode to specific conditions regardless the PAPR-MPR values) may be included in the mapping table. For example, the RB mapping module may further refer to a customized RB length value. In this embodiment, the RB information may comprise a RB count and a RB allocation type of the instantaneous TX signal. When the RB count meets a predetermined condition (e.g. when the RB count is less than or equal to the customized RB length value), the DSP circuit 100 may select a predetermined current mode (e.g. the low current mode) from the multiple candidate current modes to be the target current mode. When the RB count does not meet the predetermined condition (e.g. when the RB count is greater than the customized RB length value), the DSP circuit 100 may determine which one of the inner RB allocation, the outer RB allocation and the edge RB allocation is the RB allocation type of the instantaneous TX signal, and then determines the target current mode at least according to the RB allocation type (e.g. according to the RB allocation type, the MCS and the OFDM type). For example, when the instantaneous TX signal is transmitted in DFT-s-OFDM, 16QAM and inner edge, the DSP circuit 100 may search for the instantaneous condition of DFT-s-OFDM, 16QAM and inner edge in the predetermined mapping table (e.g. Table 2), and therefore determine that the target current mode is the low current mode. In another example, when the instantaneous TX signal is transmitted in CP-OFDM, QPSK and outer edge, the DSP circuit 100 may search for the instantaneous condition of CP-OFDM, QPSK and outer edge in the predetermined mapping table (e.g. Table 2), and therefore determine that the target current mode is the high current mode.

Figure 5:
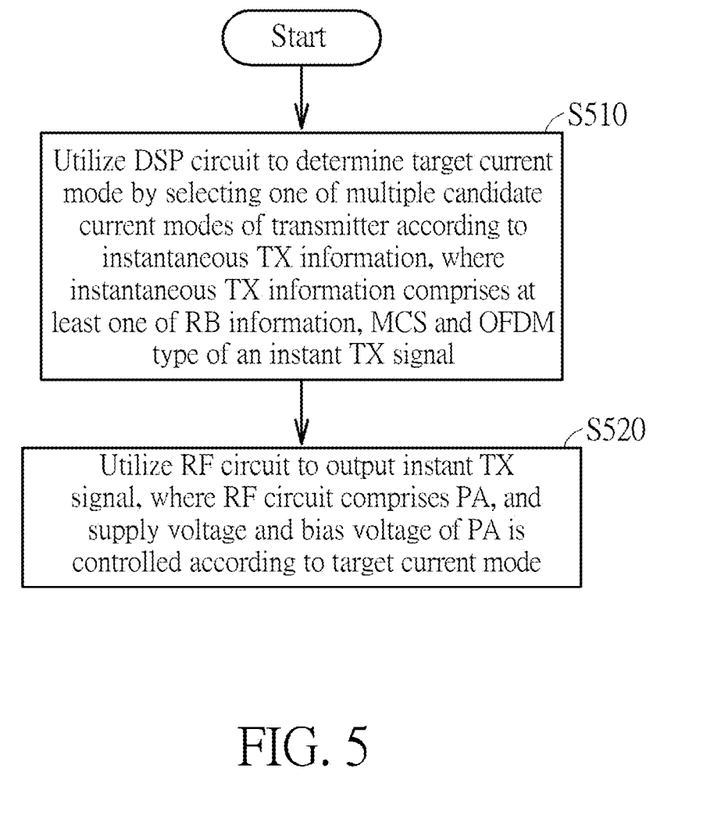
FIG. 5 is a diagram illustrating a working flow of a method for dynamically setting a current mode of a transmitter according to an embodiment of the present invention.

FIG. 5 is a diagram illustrating a working flow of a method for dynamically setting a current mode of a transmitter (e.g. the transmitter 10 or 20) according to an embodiment of the present invention. It should be noted that the working flow shown in FIG. 5 is for illustrative purposes only, and is not meant to be a limitation of the present invention. For example, one or more steps may be added, deleted or modified in the working flow shown in FIG. 5. In addition, if a same result can be obtained, these steps do not have to be executed in the exact order shown in FIG. 5.

In Step S510, the transmitter may utilize a DSP circuit (e.g. the DSP circuit 100) therein to determine a target current mode by selecting one of multiple candidate current modes of the transmitter according to instantaneous TX information, where the instantaneous TX information comprises at least one of a RB information, a MCS, and an OFDM type of an instantaneous TX signal.

In Step S520, the transmitter may utilize a RF circuit (e.g. the RF circuit 120 or 120') therein to output the instantaneous TX signal, where the RF circuit comprises a PA (e.g. the PA 123), and at least one supply voltage and at least one bias voltage of the PA is controlled according to the target current mode.

Figure 6:
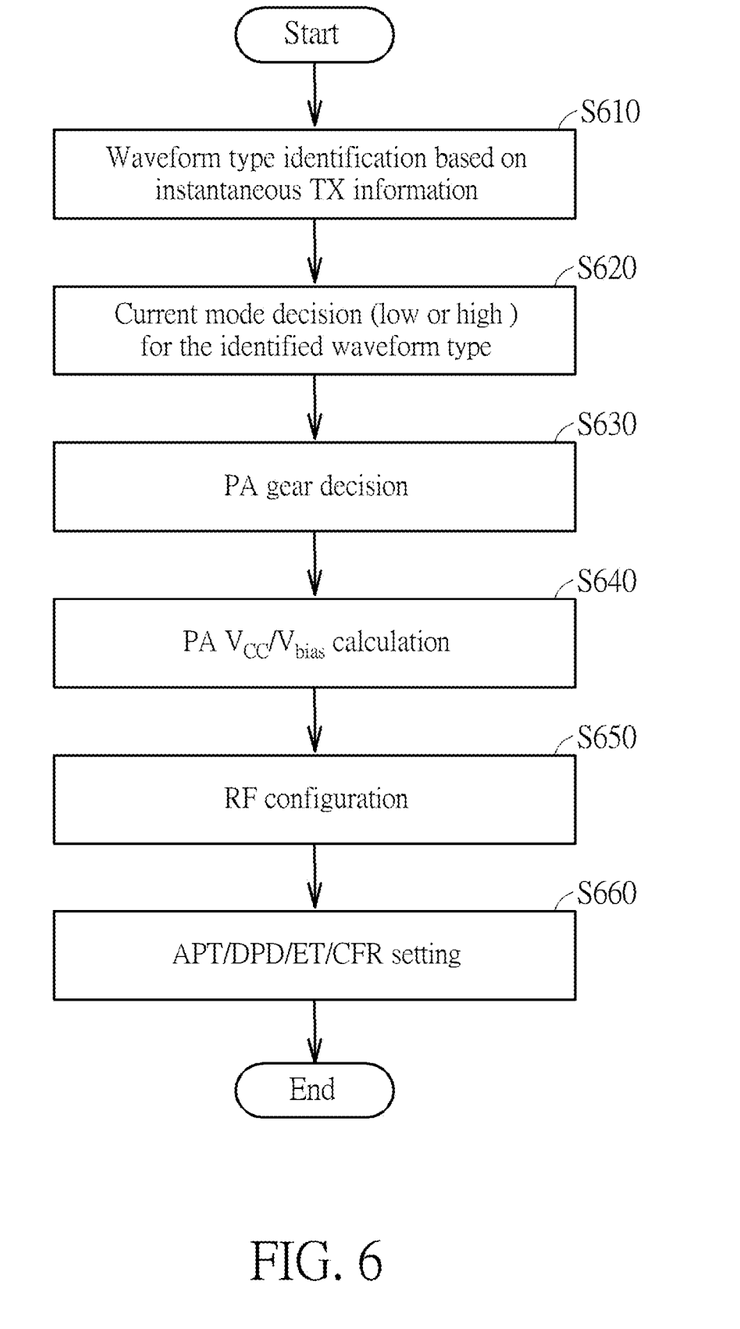
FIG. 6 is a diagram illustrating a working flow of an example of the method shown in FIG. 1 according to an embodiment of the present invention.

FIG. 6 is a diagram illustrating a working flow of an example of the method shown in FIG. 1 according to an embodiment of the present invention. It should be noted that the working flow shown in FIG. 6 is for illustrative purposes only, and is not meant to be a limitation of the present invention. For example, one or more steps may be added, deleted or modified in the working flow shown in FIG. 6. In addition, if a same result can be obtained, these steps do not have to be executed in the exact order shown in FIG. 6.

In Step S610, the DSP circuit 100 may perform waveform type identification based on the instantaneous TX information (e.g. searching for the instantaneous TX information in the predetermined mapping table as mentioned above).

In Step S620, the DSP circuit 100 may perform current mode decision (e.g. setting to whether the high current mode or the low current mode) for the identified waveform type.

In Step S630, the DSP circuit 100 may perform PA gear decision, in order to determine the PA gear of the PA 123 in response to the selected current mode.

In Step S640, the DSP circuit 100 may perform calculation of the supply voltage and the bias voltage (labeled "PA $V_{CC}/V_{bias}$ calculation" in FIG. 6 for brevity) according to the PA gear determined in Step S630, and transmit the calculation result to the RF circuit 120 (e.g. the ET<125 or the PMIC 126), in order to apply corresponding levels of the supply voltage and the bias voltage to the PA 123.

In Step S650, the RF circuit 120 may apply corresponding RF configuration(s) to other components therein (e.g. applying corresponding RF gain to the PGA 122).

In Step S660, the DSP circuit 100 may transmit information of the PA gear to the baseband front-end circuit 110, to make the baseband front-end circuit 110 apply corresponding configuration(s) to the components therein, such as APT/DPD/ET/CFR settings.

It should be note that even though the embodiments of the present invention takes the high current mode and the low current mode as examples of the multiple candidate current modes of the transmitter, but the number of the multiple candidate current modes is not limited thereto. In some embodiment, the multiple candidate current modes may further comprise a medium current mode.

In some embodiment, the instantaneous TX information may further comprise at least one of a CBW (e.g. 20 MHz), a target transmitted power (e.g. 23 dBm), a traffic type (e.g. voice over noise rating (NR)), a physical channel type (e.g. physical uplink shared channel) and a network scenario. For example, the mapping table (e.g. Table 2 shown above) can be further extend to include conditions of different CBWs, different target transmitted powers, different traffic types, different physical channel types and/or different network scenarios which corresponding assigned current mode (e.g. the high current mode or the low current mode) Thus, the DSP circuit 100 may determine the target current mode further according to at least one of the CBW, the target transmitted power, the traffic type, the physical channel type and the network scenario, but the present invention is not limited thereto.

To summarize, the embodiments of the present invention can control the current mode, the PA gear, and the supply voltage and the bias voltage of the PA 123 according to the instantaneous TX information, in order to make the transmitter 10 or 20 achieve optimized power efficiency under various instantaneous TX conditions. In addition, the embodiment will not greatly increase additional costs. Thus, the present invention can solve the problem of the related art without introducing any side effect or in a way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transmitter, comprising:
a digital signal processing (DSP) circuit, configured to determine a target current mode by selecting one of multiple candidate current modes of the transmitter according to instantaneous transmitting (TX) information, wherein the instantaneous TX information comprises at least one of a resource block (RB) information, a modulation and coding scheme (MCS), and an orthogonal frequency-division multiplexing (OFDM) type of an instantaneous TX signal; and
a radio frequency (RF) circuit, configured to output the instantaneous TX signal, wherein the RF circuit comprises a power amplifier (PA), and at least one supply voltage and at least one bias voltage of the PA is controlled according to the target current mode;
wherein the multiple candidate current modes correspond to different target power consumptions of the transmitter, respectively.

2. The transmitter of claim 1, wherein the DSP circuit determines a PA gear according to the target current mode, and the at least one supply voltage and the at least one bias voltage of the PA are controlled according to the PA gear.

3. The transmitter of claim 2, further comprising:
a baseband front-end circuit, configured to perform pre-processing on a source signal to generate a pre-processed signal, to make the RF circuit output the instantaneous TX signal according to the pre-processed signal;

wherein at least one baseband configuration of the baseband front-end circuit is controlled according to the PA gear.

4. The transmitter of claim 1, wherein the RB information comprises a RB allocation type, the DSP circuit determines which one of inner RB allocation, outer RB allocation and edge RB allocation is the RB allocation type of the instantaneous TX signal according to a channel bandwidth (CBW), a sub-carrier spacing (SCS) and a RB length of the instantaneous TX signal.

5. The transmitter of claim 1, wherein the RB information comprises a RB count and a RB allocation type of the instantaneous TX signal; when the RB count meets a predetermined condition, the DSP circuit selects a predetermined current mode from the multiple candidate current modes to be the target current mode; and when the RB count does not meet the predetermined condition, the DSP circuit determines which one of inner RB allocation, outer RB allocation and edge RB allocation is the RB allocation type of the instantaneous TX signal, and determines the target current mode at least according to the RB allocation type.

6. The transmitter of claim 1, wherein the DSP circuit determines which one of binary phase-shift keying (BPSK), quadrature phase-shift keying (QPSK), 16-quadrature amplitude modulation (16-QAM), 64-quadrature amplitude modulation (64-QAM), and 256-quadrature amplitude modulation (256-QAM) is the MCS of the instantaneous TX signal.

7. The transmitter of claim 1, wherein the DSP circuit determines which one of cyclic prefix orthogonal frequency division multiplexing (CP-OFDM) and discrete fourier transform-spreading orthogonal frequency division multiplexing (DFT-s-OFDM) is the OFDM type of the instantaneous TX signal.

8. The transmitter of claim 1, wherein the DSP circuit generates a waveform type identifier (ID) according to the RB information, the MCS, and the OFDM type of the instantaneous TX signal, and determines the target current mode corresponding to the waveform type ID by searching the waveform type ID in a look-up table.

9. The transmitter of claim 1, wherein the RF circuit further comprises a programmable gain amplifier (PGA), and a RF gain gear of the PGA is controlled according to the target current mode.

10. The transmitter of claim 1, wherein the instantaneous TX information further comprises at least one of a channel bandwidth (CBW), a target transmitted power, a traffic type, a physical channel type and a network scenario.

11. A method for dynamically setting a current mode of a transmitter, comprising:
utilizing a digital signal processing (DSP) circuit of the transmitter to determine a target current mode by selecting one of multiple candidate current modes of the transmitter according to instantaneous transmitting (TX) information, wherein the instantaneous TX information comprises at least one of a resource block (RB) information, a modulation and coding scheme (MCS), and an orthogonal frequency-division multiplexing (OFDM) type of an instantaneous TX signal; and
utilizing a radio frequency (RF) circuit of the transmitter to output the instantaneous TX signal, wherein the RF circuit comprises a power amplifier (PA), and at least one supply voltage and at least one bias voltage of the PA is controlled according to the target current mode; wherein the multiple candidate current modes correspond to different target power consumptions of the transmitter, respectively.

12. The method of claim 11, wherein utilizing the DSP circuit of the transmitter to determine the target current mode by selecting one of multiple candidate current modes of the transmitter according to the instantaneous TX information comprises:
utilizing the DSP circuit to determine a PA gear according to the target current mode;
wherein the at least one supply voltage and the at least one bias voltage of the PA are controlled according to the PA gear.

13. The method of claim 12, further comprising:
utilizing a baseband front-end circuit of the transmitter to perform pre-processing for the instantaneous TX signal;
wherein at least one baseband configuration of the baseband front-end circuit is controlled according to the PA gear.

14. The method of claim 11, wherein the RB information comprises a RB allocation type, the DSP circuit determines which one of inner RB allocation, outer RB allocation and edge RB allocation is the RB allocation type of the instantaneous TX signal according to a channel bandwidth (CBW), a sub-carrier spacing (SCS) and a RB length of the instantaneous TX signal.

15. The method of claim 11, wherein the RB information comprises a RB count and a RB allocation type of the instantaneous TX signal, and utilizing the DSP circuit of the transmitter to determine the target current mode by selecting one of the multiple candidate current modes of the transmitter according to the instantaneous TX information comprises:
in response to the RB count meeting a predetermined condition, utilizing the DSP circuit to select a predetermined current mode from the multiple candidate current modes to be the target current mode.

16. The method of claim 11, wherein the RB information comprises a RB count and a RB allocation type of the instantaneous TX signal, and utilizing the DSP circuit of the transmitter to determine the target current mode by selecting one of the multiple candidate current modes of the transmitter according to the instantaneous TX information comprises:
in response to the RB count which does not meet a predetermined condition, utilizing the DSP circuit to determine which one of inner RB allocation, outer RB allocation and edge RB allocation is the RB allocation type of the instantaneous TX signal, and determining the target current mode at least according to the RB allocation type.

17. The method of claim 11, wherein utilizing the DSP circuit of the transmitter to determine the target current mode by selecting one of the multiple candidate current modes of the transmitter according to the instantaneous TX information comprises:
utilizing the DSP circuit to determine which one of binary phase-shift keying (BPSK), quadrature phase-shift keying (QPSK), 16-quadrature amplitude modulation (16-QAM), 64-quadrature amplitude modulation (64-QAM), and 256-quadrature amplitude modulation (256-QAM) is the MCS of the instantaneous TX signal.

18. The method of claim 11, wherein utilizing the DSP circuit of the transmitter to determine the target current mode by selecting one of the multiple candidate current modes of the transmitter according to the instantaneous TX information comprises:
utilizing the DSP circuit to determine which one of cyclic prefix orthogonal frequency division multiplexing (CP- OFDM) and discrete fourier transform-spreading orthogonal frequency division multiplexing (DFT-s-OFDM) is the OFDM type of the instantaneous TX signal.

19. The method of claim 11, wherein utilizing the DSP circuit of the transmitter to determine the target current mode by selecting one of the multiple candidate current modes of the transmitter according to the instantaneous TX information comprises:

utilizing the DSP circuit to generate a waveform type identifier (ID) according to the RB information, the MCS, and the OFDM type of the instantaneous TX signal, and determining the target current mode corresponding to the waveform type ID by searching the waveform type ID in a look-up table.

20. The method of claim 11, wherein the RF circuit further comprises a programmable gain amplifier (PGA), and a RF gain gear of the PGA is controlled according to the target current mode.

21. The method of claim 11, wherein the instantaneous TX information further comprises at least one of a channel bandwidth (CBW), a target transmitted power, a traffic type, a physical channel type and a network scenario.

* * * * *